(12) United States Patent
Julson et al.

(10) Patent No.: US 8,935,040 B2
(45) Date of Patent: Jan. 13, 2015

(54) METHOD AND SYSTEM FOR ACTIVELY LOCATING BUS FAULTS

(75) Inventors: Timothy D. Julson, Rochester Hills, MI (US); Robert F. Kirchhoff, Macomb, MI (US); Gary W. Taraski, Oxford, MI (US); John J. Flood, IV, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 246 days.

(21) Appl. No.: 13/595,280

(22) Filed: Aug. 27, 2012

(65) Prior Publication Data

US 2014/0058620 A1 Feb. 27, 2014

(51) Int. Cl.
*G06F 7/00* (2006.01)
*G06F 19/00* (2011.01)

(52) U.S. Cl.
USPC ............................................. 701/32; 701/32.1

(58) Field of Classification Search
USPC ....................................................... 701/32.7
See application file for complete search history.

(56) References Cited

U.S. PATENT DOCUMENTS

| 5,036,479 | A  | * | 7/1991  | Prednis et al. ................ 702/121 |
| 7,356,430 | B2 | * | 4/2008  | Miguelanez et al. ......... 702/108 |
| 7,812,617 | B2 | * | 10/2010 | Hofman ........................ 324/639 |
| 8,165,745 | B2 | * | 4/2012  | Sakurai et al. ............... 701/31.3 |
| 2005/0080593 | A1 | * | 4/2005 | Blaser ........................... 702/183 |
| 2007/0061631 | A1 | * | 3/2007 | Nakamura ....................... 714/43 |
| 2007/0076593 | A1 | * | 4/2007 | Sakurai et al. ................ 370/219 |
| 2007/0220330 | A1 | * | 9/2007 | Nauerz et al. ................... 714/26 |
| 2008/0059839 | A1 | * | 3/2008 | Hamilton et al. ............... 714/26 |
| 2008/0127293 | A1 | * | 5/2008 | Cohen et al. ...................... 726/1 |
| 2010/0033207 | A1 | * | 2/2010 | Kelem et al. ...................... 326/9 |
| 2010/0211258 | A1 | * | 8/2010 | Sakurai et al. .................. 701/31 |
| 2014/0164846 | A1 | * | 6/2014 | Unrein et al. ................... 714/45 |

\* cited by examiner

*Primary Examiner* — Ian Jen
(74) *Attorney, Agent, or Firm* — Ingrassia Fisher & Lorenz, P.C.

(57) ABSTRACT

Methods and systems are provided for analyzing a fault in a communication system. The system includes a diagnostic module. The diagnostic module has first through fifth control logics. The first control logic is configured to determine a topology of the communication system. The second control logic is configured to request a response from at least one module that is in electronic communication with the communication system. The third control logic is configured to receive the response. The fourth control logic is configured to analyze a characteristic of the response. The fifth control logic is configured to determine a characteristic of the fault based on the characteristic of the response.

20 Claims, 4 Drawing Sheets

METHOD AND SYSTEM FOR ACTIVELY LOCATING BUS FAULTS

TECHNICAL FIELD

The technical field generally relates to fault detection in communication systems, and more particularly relates to actively locating faults in a vehicle communication system.

BACKGROUND

A typical automobile includes communication systems with 30 or more modules that communicate electronically through several hundred (power, ground, signals per unit) of the thousand plus wires that make up a vehicle system. The total wire usage can be a mile or more in combined length. The probability of a failure or fault and the difficulty of finding the failure or fault increases with each wire and connection added to the communication system. Furthermore, the wires and connections are often difficult to reach due to integrated packaging in an effort to conceal the wires for aesthetic purposes.

One method of finding a fault in a communication system is to passively listen to the communication system and apply time domain reflectometry methodology on the signal to determine the fault location. The passive method can detect segment locations between modules in a modern automobile. For example, the source of the signal may broadcast infrequently or be located in different locations on the communication system depending on the installed options in the vehicle. The passive time domain reflectometry analysis thus is limited to obtain which module segment pairing is affected by location.

Accordingly, it is desirable to more reliably locate faults in a communication system. Furthermore, other desirable features and characteristics of the present invention will become apparent from the subsequent detailed description and the appended claims, taken in conjunction with the accompanying drawings and the foregoing technical field and background.

SUMMARY

An apparatus is provided for analyzing a fault. In one embodiment, the apparatus includes a diagnostic module. The diagnostic module has first through fifth control logics. The first control logic is configured to determine a topology of the communication system. The second control logic is configured to request a response from at least one module that is in electronic communication with the communication system. The third control logic is configured to receive the response. The fourth control logic is configured to analyze a characteristic of the response. The fifth control logic is configured to determine a characteristic of the fault based on the characteristic of the response.

In another embodiment, a vehicle includes a communication bus, at least one bus module, and a diagnostic module. The communication bus includes a plurality of wires. Thus, at least one bus module is electronically coupled with the plurality of wires and configured to send a diagnostic message by an electronic signal in response to a diagnostic request. The physical arrangement and the characteristics of the wires and the at least one bus module define a topology. The diagnostic module analyzes a fault and includes first through fifth control logics. The first control logic is configured to determine the topology. The second control logic is configured to send the diagnostic request to the at least one bus module. The third control logic is configured to receive the diagnostic message. The fourth control logic is configured to analyze at least one of a tail end, a time delay, and a magnitude of the electronic signal. The fifth control logic is configured to determine location of the fault and a type of the fault based on the analysis of the electronic signal.

A method is provided for analyzing a fault in a communication system. In one embodiment, the method includes: determining a topology of the communication system; requesting a response from at least one module that is in electronic communication with the communication system; receiving the response at a diagnostic module that is in electronic communication with the communication system; analyzing a characteristic of the response; and determining a characteristic of the fault based on the characteristic of the response.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Generally, various original equipment manufacturer (OEM) vehicle diagnostics systems are setup using the known seven layer open systems interconnection (OSI) model. The end result is that each OEM uses the upper layers for applications to report out a diagnostic trouble code (DTC) which is reported back to layer 1, the physical layer. The service technician reads the codes and begins a lengthy fault tree interrogation to find where the actual physical fault is located. The embodiments provided use the same diagnostic approach. However, when the diagnostic message is sent out between modules, the DTC although important is not the parameter sought after. Rather the quality of the signal response is measured both in time and magnitude. This is compared to the normal message response that is received when no fault is present. The vehicle then analyzes the signal propagation and distortion delay through the communication bus to determine the location of a fault in the communication bus.

Figure 1:
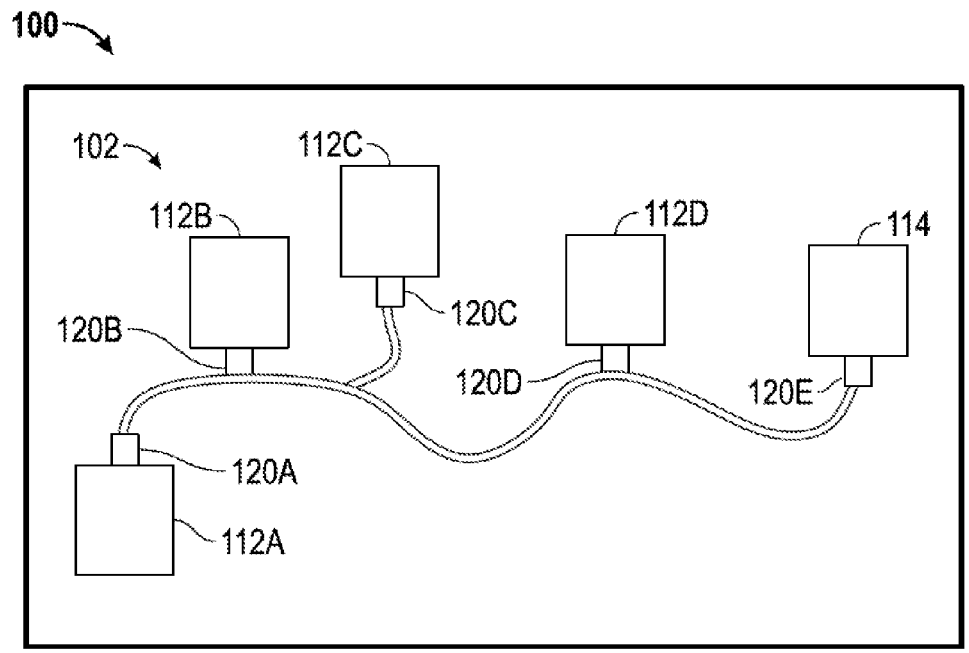
FIG. 1 is a simplified block diagram of a vehicle and a communication system in accordance with an embodiment.

Referring now to FIG. 1, a simplified block diagram is shown illustrating a vehicle 100 with a controller area network (CAN) bus 102. The vehicle 100 illustrated is an automobile. In alternative embodiments the vehicle 100 is of a different type, such as watercraft or aircraft.

The CAN bus 102 includes a plurality of electrical wires 110, first, second, third, fourth, and fifth modules 112A-D, and a diagnostic module 114. The modules 112A-D, 114 are electronically coupled with the wires 110 by first, second, third, fourth, and fifth connectors 120A-E. The physical characteristics of the wires 110 and placement of the modules 112A-D, 114 at least partially determine a topology of the CAN bus 102. For example, the length of wires 110 between modules 112A-D, 114, the number of modules 112A-D, the branching of the wires 110, and the impedance throughout the CAN bus 102 all contribute to determining the topology of the CAN bus 102. For example, an automobile may be ordered with various options that add modules and alter the topology of the CAN bus 102. The topology impacts the propagation delay of an electronic signal sent through the CAN bus 102, as is described below with reference to FIG. 4. It should be appreciated that communications systems other than a CAN bus 102 and topologies having configurations other than the distributed linear configuration shown may be incorporated.

Each of the modules 112A-D interfaces with a component of the vehicle. The modules may be of any type. For example, the modules 112A-E may include an engine control module, a brake control module, a transmission control module, an adaptive cruise module, or an electronic park brake module. Each of the modules 112A-D is configured to receive a diagnostic request from the diagnostic module 114. In response to the diagnostic request, the requested module 112A-D sends a diagnostic report that includes various trouble codes and information relating to the detected status of the module 112A-D. Each diagnostic report is communicated through the wires 110 by an electronic signal, as will be described below with reference to FIGS. 2-4.

Figure 2:
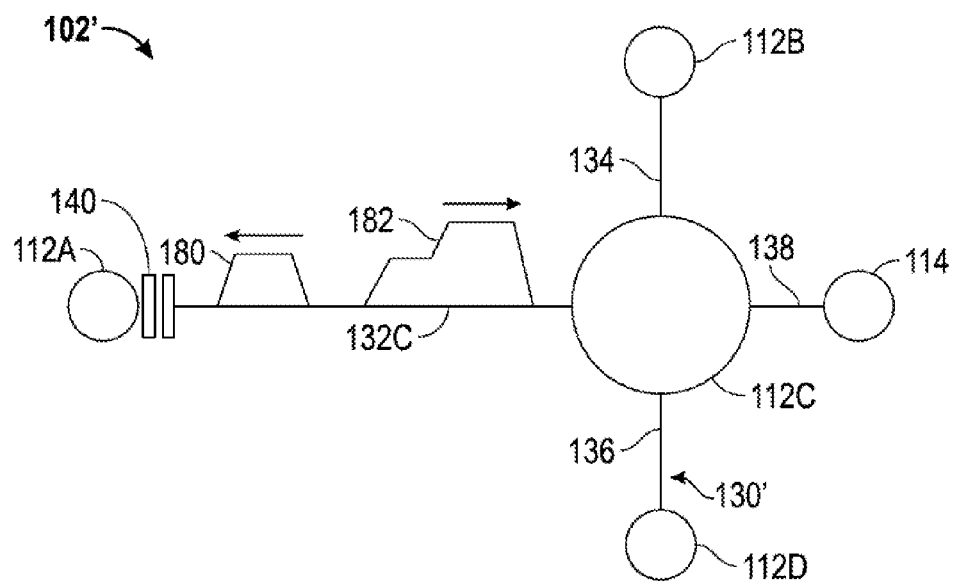
FIG. 2 is a simplified block diagram of a communication system in accordance with an embodiment.

Referring now to FIG. 2, a simplified block diagram of an alternative CAN bus 102' is illustrated. The CAN bus 102' is similar to the CAN bus 102, where like numbers refer to like components. The CAN bus 102' includes a plurality of wires 130 and a topology that are different from the wires 110 and topology of the CAN bus 102. The wires 130 include a first wire 132, a second wire 134, a third wire 136, and a fourth wire 138. The first wire 132 electronically couples the first module 112A with the third module 112C. In the example provided, the first wire 132 includes a fault 140. The fault 140 may be any type of fault, such as poor terminal contact, terminal corrosion, fluid in the connection, or other fault types. The second wire 134 electronically couples the third module 112C with the second bus module 112B. The third wire 136 electronically couples the fourth module 112D with the third module 112C. The third wire 136 is electronically coupled with the first wire 132 to pass the electronic signal that carries the diagnostic report to the diagnostic module 114.

Figure 3:
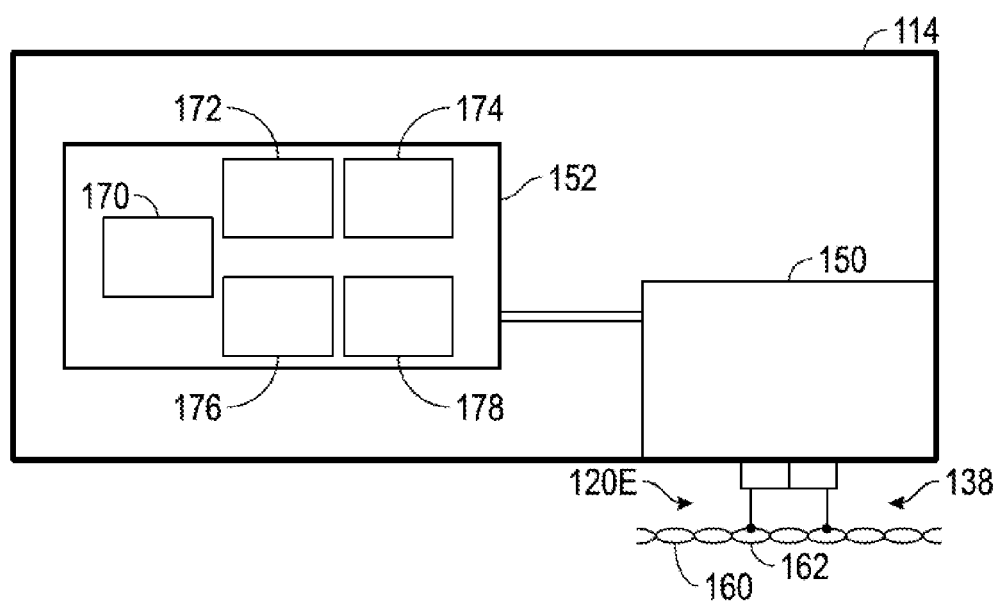
FIG. 3 is a simplified block diagram of a diagnostic module in accordance with an embodiment.
Figure 4:
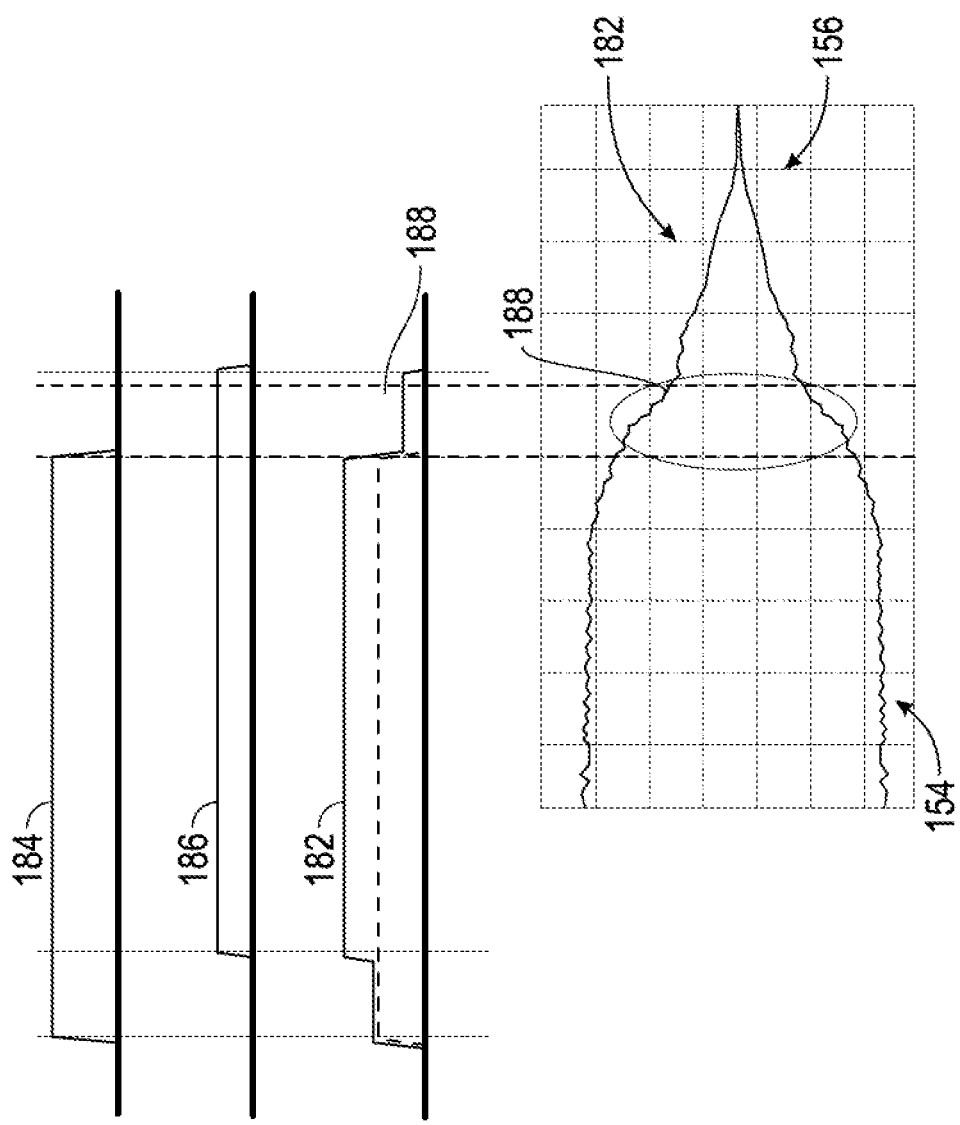
FIG. 4 is a graphical view of signals communicated through the communication system in accordance with an embodiment.

With further reference to FIGS. 3 and 4, and with continued reference to FIG. 2, a simplified block diagram of the diagnostic module 114 is shown in FIG. 3 and a graph of electronic signals is shown in FIG. 4. The diagnostic module 114 may be a dedicated module or may incorporate functions of any of the modules 112A-D. Furthermore, the diagnostic module 114 may be an installed component in the communication system or may be a plug in type diagnostic tool. The diagnostic module 114 includes a transceiver 150 and a signal analysis controller 152. The transceiver 150 generates and receives digital electronic signals that include sequences of high and low voltages. The sequences of high and low voltages include high voltage portions 154 and low voltage portions 156, as illustrated in FIG. 4. In the example provided, the transceiver 150 generates and receives the high and low portions 154, 156 as a voltage difference between a CAN high wire 160 and a CAN low wire 162.

The signal analysis controller 152 includes first, second, third, fourth, and fifth control logics 170, 172, 174, 176, 178, respectively. The first control logic is configured to determine the topology of the CAN bus 102 or 102'. For example, the first control logic 170 may retrieve preprogrammed topology information or may use a look up table to determine the topology based on the installed modules 112A-D. As described above, the topology information may include lengths of the wires 110, a connection configuration among the wires and the modules, and an expected impedance of each of the wires in the absence of the fault.

The second control logic 172 is configured to send diagnostic requests to the modules 112A-D. Each request is directed to a single module. For example, the second control logic 172 may send a first diagnostic request to the first module 112A and a second diagnostic request to the second bus module 112B. The diagnostic request is communicated by an electronic signal 180 shown symbolically in FIG. 2.

The third control logic 174 is configured to receive a diagnostic electronic signal that communicates the diagnostic report from a module 112A-D. The electric signal received is from the module that was targeted by the diagnostic request in the second control logic 172. The received diagnostic electronic signal includes a plurality of high voltage pulses 182 that are each a combination of an original diagnostic pulse 184 and a reflected diagnostic pulse 186, as indicated in FIG. 4. The original diagnostic pulse 184 has a pulse profile as was sent by the module 112A-D that sent the diagnostic request. The reflected diagnostic pulse 186 is the pulse energy that is altered by the impedance change at the fault 140.

The fourth control logic 176 is configured to analyze the received pulse 186 to determine a characteristic of the reflected pulse 186. The fourth control logic 176 incorporates known time domain reflectometry techniques to analyze the magnitude, duration, or shape of the received pulse 186. The diagnostic signal has a pattern of high pulses 154 and low pulses 156 that is generally consistent for a given status of the module. Therefore, the fourth control logic 176 uses the predictable pattern of the high pulses 154 to analyze the received pulse 186. In the example provided, the fourth control logic 176 analyzes a width of the tail end 188 of the received pulse 186. The width of the tail end 188 is generally indicates a time delay due to the impedance change at the fault 140 and is measured as an amount of time it takes the pulse 186 to go from a first voltage to a second lower voltage. Alternative profile and tail end characteristics may be used to determine the characteristics of the reflected pulse 186.

The fifth control logic 178 is configured to determine at least one of a location of the fault 140 and a type of the fault 140 based on the characteristic of the response. In the example provided the fifth control logic 178 looks up a profile of the tail end 188 in a table of known defect profiles to determine the type of fault. For example, a library of time delays for various impedance anomalies may be used to determine whether the fault is a disconnection, poor terminal contact, terminal corrosion, fluid in connection, or other fault.

The fifth control logic 178 additionally determines the location of the fault 140 based on the known time domain reflectometry analysis performed at the fourth control logic 176. For example, the fifth control logic 178 may compare an expected time delay or width of the tail end 188 with an expected time delay or width of the tail end 188. The expected width of the tail end 188 is the measured width of the tail end 188 in the absence of the fault 140 for a given topology. The location of the fault causes a propagation delay of the signal that is measured at the tail end 188 to determine the location of the fault 140.

Figure 5:
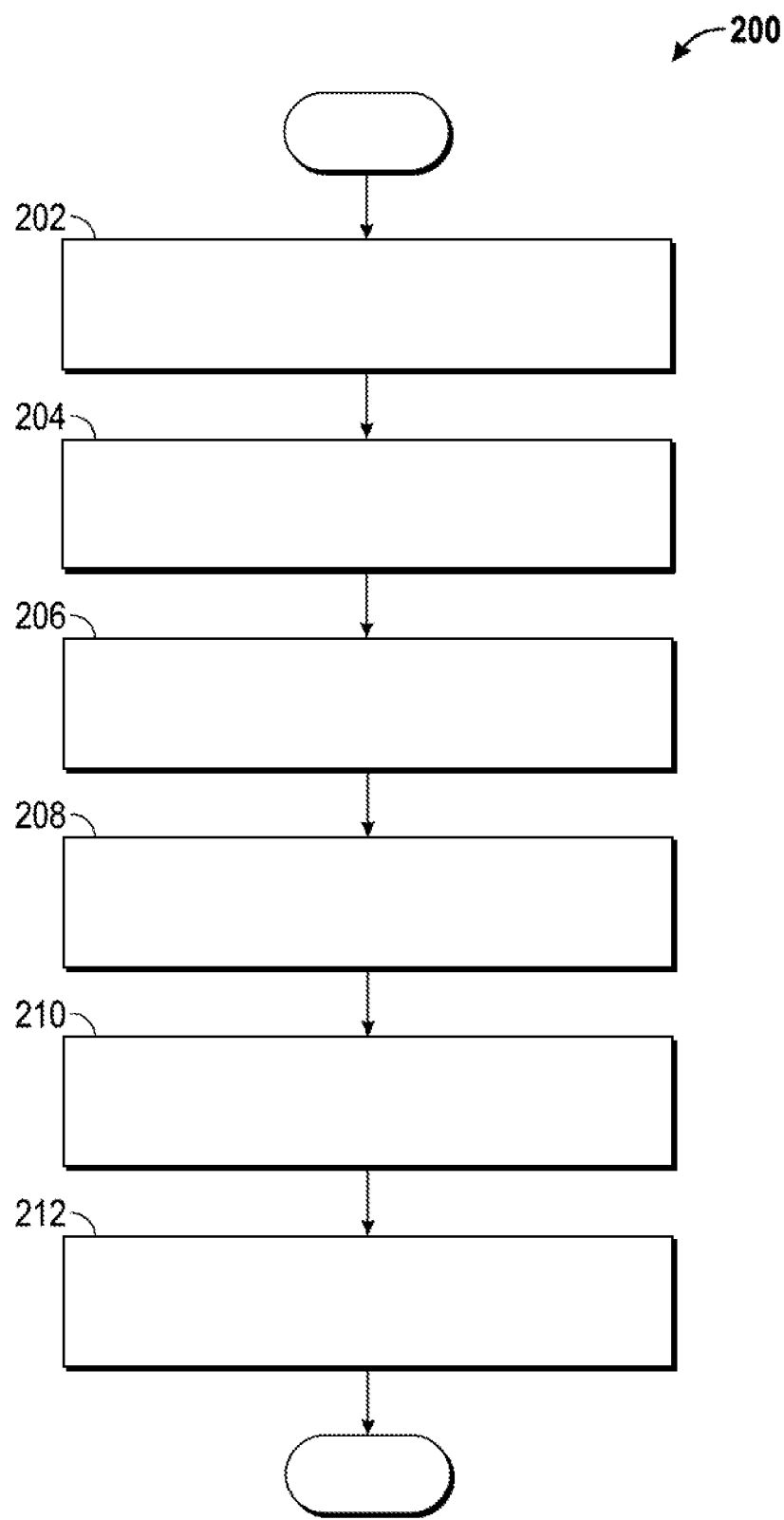
FIG. 5 is a flow diagram illustrating a method of analyzing a fault in a communication system in accordance with an embodiment.

Referring now to FIG. 5, a flow diagram illustrates a method 200 of analyzing a fault in a communication system. The topology of the communication system is determined in step 202. For example, the first control logic 170 of the diagnostic module may use a table to look up the lengths of the wires 110, the configuration of the modules 112A-D, and the expected impedance through the CAN bus 102. In the embodiment provided the diagnostic module 114 retrieves a line segment fault code in step 204. The line segment fault code indicates which segment of the wires 110 between two of the modules 112A-D includes a fault. In alternative embodiments the method is performed without receiving a fault code. For example, the method may be performed at a factory after the vehicle has been built to confirm that no faults exist.

At step 206 a diagnostic request is sent to a module near the fault. For example, the second control logic 172 of the diagnostic module 114 may send a diagnostic request to the first module 112A that is located past the fault 140 on the wire 132. The first module 112A sends a diagnostic report that is communicated through the communication system by an electronic signal. The electronic signals are received in step 208. For example, the third control logic 174 may receive an electronic signal that is similar to the similar to the pulse 182 from the first module 112A.

The tail end of the electronic signal is then analyzed to determine a time delay of the electronic signal in step 210. For example, the fourth control logic 176 of the diagnostic module 114 may determine a width of the tail end 188 of the pulse 182 that indicates the profile of the reflected pulse 186. The signal quality of the signal is analyzed independently of the content of the diagnostic report communicated by the signal.

In step 212 a type of fault and a fault location are determined based on the analysis performed in step 210. For example, the fifth control logic 178 of the diagnostic module 114 may use a lookup table to compare the actual time delay with a list of time delays corresponding to various fault locations and types. The type of fault and fault location are then sent out in step 214. For example, the diagnostic module 114 may display the fault type and location on a screen or send the faulty type and location to a separate device for display to a technician or user of the vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for analyzing a fault onboard a vehicle, the system comprising:
a controller area network (CAN) bus of the vehicle, comprising:
a plurality of electrical wires;
a module, electronically coupled with the CAN bus and configured to interface with a component of the vehicle; and
a diagnostic module, electronically coupled with the CAN bus, the diagnostic module comprising:
a first control logic configured to determine a topology of a communication system, wherein the communication system comprises the CAN bus;
a second control logic configured to request a response from the module that is in electronic communication with the communication system, the response comprising an electronic signal communicating a report from the module;
a third control logic configured to receive the response;
a fourth control logic configured to analyze a characteristic of the response; and
a fifth control logic configured to determine a characteristic of the fault based on the characteristic of the response.

2. The system of claim 1 wherein the first control logic is further configured to determine a length of a plurality of wires of the communication system, a connection configuration among the wires, and an expected impedance through the communication system in the absence of the fault.

3. The system of claim 1 wherein the second control logic is further configured to receive a fault indicator message and send a diagnostic request from the diagnostic module to the at least one module in response to the fault indicator message.

4. The system of claim 1 wherein the second control logic is further configured to receiving an indicator of what wire segment in the communication system includes the fault and select the at least one module so that the response communicates across the fault.

5. The system of claim 1 wherein the response is a diagnostic report communicated by an electrical signal, and wherein the characteristic of the response that the fourth control logic is configured to analyze is a tail end of a high portion of the electrical signal.

6. The system of claim 5 wherein the characteristic of the response is a width of the tail end.

7. The system of claim 1 wherein the characteristic of the fault is at least one of a location of the fault and a type of the fault.

8. The system of claim 1 wherein the fifth control logic is further configured to determine an expected time delay based on the topology, and wherein the characteristic of the response that the fourth control logic is configured to analyze is an actual time delay of the response, and wherein the fifth control logic is further configured to compare the expected time delay and the actual time delay of the response.

9. The system of claim 1 further including the at least one module and a plurality of wires coupled for electronic communication among the at least one module and the diagnostic module.

10. A vehicle comprising:
a communication bus including a plurality of wires;
at least one bus module electronically coupled with the plurality of wires and configured to send a diagnostic message by an electronic signal in response to a diagnostic request wherein the at least one bus module is further configured to interface with a component of the vehicle;
wherein a physical arrangement and a plurality of characteristics of the plurality of wires and the at least one bus module define a topology; and a diagnostic module for analyzing a fault, the diagnostic module comprising:
- a first control logic configured to determine the topology;
- a second control logic configured to send the diagnostic request to the at least one bus module;
- a third control logic configured to receive the diagnostic message;
- a fourth control logic configured to analyze at least one of a tail end, a time delay, and a magnitude of the electronic signal; and
- a fifth control logic configured to determine at least one of a location of the fault and a type of the fault based on the analysis of the electronic signal.

11. The vehicle of claim 10 wherein the first control logic is further configured to determine a length of the plurality of wires of the communication bus, a connection configuration among the wires, and an expected impedance of each of the wires in the absence of the fault to determine the topology.

12. The vehicle of claim 10 wherein the fifth control logic is further configured to determine an expected time delay of the electronic signal based on the topology in the absence of the fault, and wherein the fourth control logic is configured to determine an actual time delay of the electronic signal, and wherein the fifth control logic is further configured to compare the expected time delay with the actual time delay to determine the at least one of the location and type of the fault.

13. A method of analyzing a fault in a communication system onboard a vehicle, the method comprising:
- determining a topology of the communication system, the communication system comprising a communication bus, a plurality of electrical wires, a module configured to interface with a component of the vehicle, and a diagnostic module;
- requesting a response from the module, the response comprising an electronic signal communicating a report from the module;
- receiving the response at the diagnostic module;
- analyzing a characteristic of the response; and
- determining a characteristic of the fault based on the characteristic of the response.

14. The method of claim 13 wherein determining a topology further includes determining a length of a plurality of wires, a connection configuration among the wires, and an expected impedance through the communication system in the absence of the fault.

15. The method of claim 13 wherein requesting a response further includes sending a diagnostic request from the diagnostic module to the at least one module in response to receiving a fault indicator message.

16. The method of claim 13 wherein the method further comprises receiving an indicator of what wire segment in the communication system includes the fault, and wherein requesting the response further includes selecting the module so that the response communicates across the fault.

17. The method of claim 13 wherein receiving the response further includes receiving a diagnostic report communicated by an electrical signal, and wherein analyzing the characteristic of the response includes analyzing at least one of a time delay and magnitude of the electrical signal.

18. The method of claim 17 wherein analyzing the electrical signal includes determining a width of a tail end of a high portion of the electrical signal.

19. The method of claim 13 wherein determining the characteristic of the fault further includes determining at least one of a location of the fault and a type of the fault.

20. The method of claim 13 wherein determining the characteristic of the fault further includes determining an expected time delay based on the topology, and wherein analyzing the characteristic of the response includes determining an actual time delay of the response, and wherein determining a characteristic of the fault further includes comparing the expected time delay and the actual time delay of the response.

* * * * *